United States Patent [19]

Courtney-Pratt et al.

[11] 3,786,840
[45] Jan. 22, 1974

[54] FIBER OPTIC DEVICES AND METHOD FOR MAKING SAME

[75] Inventors: Jeofry S. Courtney-Pratt, Locust; Alfred C. Schmidt, Jr., Brunswick, both of N.J.

[73] Assignee: Bell Telephone Laboratories, Incorporated, Murray Hill, N.J.

[22] Filed: Jan. 4, 1971

[21] Appl. No.: 103,581

Related U.S. Application Data

[62] Division of Ser. No. 796,027, Feb. 3, 1969, abandoned.

[52] U.S. Cl............... 139/11, 139/408, 156/148, 156/180, 156/296, 350/96 B
[51] Int. Cl........................................... D03d 41/00
[58] Field of Search... 156/148, 180, 296; 350/96 B; 65/4; 88/1; 250/227; 139/11, 13, 317, 408

[56] References Cited
UNITED STATES PATENTS
3,045,711  7/1962  Gibbons............................ 139/408
2,925,098  2/1960  Frieder et al. ..................... 139/408
3,141,105  7/1964  Courtney-Pratt.................. 350/96 B
3,244,894  4/1966  Steele et al........................ 350/96 B
3,043,179  7/1962  Dunn ................................. 250/227
3,125,013  3/1964  Herrick, Jr. et al............... 350/96 B
3,284,772  11/1966 Stewart ............................ 350/96 B
3,489,482  1/1970  Brill.................................. 350/96 B Primary Examiner—Daniel J. Fritsch
Attorney, Agent, or Firm—C. E. Graves

[57] ABSTRACT

This disclosure describes optical fiber devices with machine-reproducible end array transformations. Image interleaving devices with specific end array transformations are described which find use in optical scramblers and color imaging. Modified multiple ply weaving techniques are used to realize the devices.

2 Claims, 10 Drawing Figures

3,786,840

FIBER OPTIC DEVICES AND METHOD FOR MAKING SAME

This is a Division of Application Ser. No. 796,027, filed Feb. 3, 1969, now abandoned.

FIELD OF THE INVENTION

This invention relates generally to the optical fiber art. Particularly, it concerns the ordered arraying of optical fibers in preselected and reproducible end patterns.

BACKGROUND OF THE INVENTION

Numerous optical fiber imaging devices have been suggested which require the fibers to run from an initial act of positions at the input end to a different set of positions at the output end. In fiber optic imaging devices, resolution and transmission capacity increases as the number of optical fibers used increases. In practice many such devices require a very large number of fibers, for example, of the order 250,000 fibers. Manual assembly of so many fibers is prohibitively time consuming and subject to operator error.

In the U. S. Pat. No. 3,141,105 of J. S. Courtney-Pratt, a process is described for realizing a one-layer web of optical fibers having a regular formation. A simple loom is used, with the optical fibers providing the weft strand. Various weaves are disclosed for joining the weft to insure a minimum of bending. The result is a single layer of optical fibers having, of course, identical end arrays.

Neither that disclosure nor—insofar as applicants are aware—any other, extended the process potential to a solution of the end array transformation problem. Thus, the lack of a machine process for realizing preprogramed, reproducible end transformations in optical fiber devices as well as the incompatability of existing device designs with available methodology, has significantly impeded development of optical image interleavers and scramblers.

Accordingly, one object of the invention is to realize optical image interleaving devices that lend themselves to practical, reproducible transformations between input and output fiber arrays.

A further object of the invention is to realize a method for preprogramed machine transformation of optical fibers from an input array to an output array.

One specific object of the invention is to realize reproducible color image interleaving devices.

Another specific object of the invention is to realize an improved method for producing identical optical scramblers and matching optical descramblers.

A further object of the invention is to realize machine methods for repositioning the location of optical fibers in a fiber optic transmission line.

SUMMARY OF THE INVENTION

The invention broadly is grounded on the use of fiber arrays consisting of rows and columns as viewed at the input and output ends. Pursuant to one aspect of the invention, fiber transformations specifically limited to position changes within the individual columns provide a means for realizing optical scramblers and interleavers in varieties restricted only by the number of rows and columns employed.

One specific device embodiment involves an optical fiber color image interleaver constructed within the above constraints. Signals of four distinct colors or optical frequencies, for example, red, blue, green and white are incident respectively upon each of four input end arrays. The fibers in each column then are led to new positions in the same column at the output end. Each input end array advantageously consists of one or more complete fiber rows. If no transformation were to occur, i.e., if each fiber appears at the same columnar position at the output array as at the input array, then the output array would have the same overall visual effect as the input array. The inventive transpositioning involves rearranging the fibers within each column according to a pattern that forms at the output end clusters each consisting of a red, a green, and a blue-transmitting fiber evenly spaced within a field of the white-transmitting fibers. An optical color interleaver then is built of numerous such modules, each consisting of, for example, basic eight-by-eight end arrays. Arrays of 9 × 9 and 6 × 9 represent other possibilities for color interleaving.

Fiber transformations involving position changes as above within individual columns is achieved, for example, on a loom of the Jacquard type. We have adapted looms to handle the fibers so as to hold them in some specific array and then to rearrange the array at a later point in the weave. Experimentation has revealed that, surprisingly, a jacquard type loom readily handles fiber weaves of the order 27 plies.

The invention, its further objects, features and advantages will be fully apprehended from a reading of the description to follow of illustrative embodiments.

DETAILED DESCRIPTION OF ILLUSTRATIVE EMBODIMENT

A general method for machine assembly of optical fiber devices incorporating the above-described fiber transformations is first described, followed by descriptions of exemplary devices.

Figure 1:
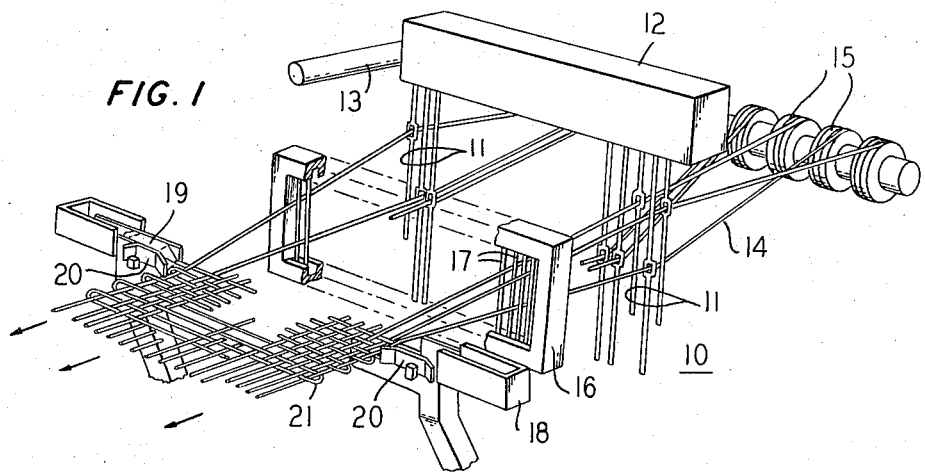
FIG. 1 is a schematic perspective view of a machine method of building an optical device according to the invention.

FIG. 1 depicts the basic components of an existing loom of the Jacquard type. The loom designated 10 consists of a plurality, i.e. from 100–500, of heddles 11. The heddles 11 are mounted for vertical movement from a Jacquard head 12 which incorporates the usual heddle raising mechanisms, not shown. The loom 10 characteristically includes a cylinder 13 which contains the program and apparatus for sequentially raising and lowering the heddles 11.

Warp thread 14 from some source such as supply reels 15 are respectively fed through heddles 11 and thereafter through the vertical reeds 17 mounted in frame 16. The spacing between reeds 17 substantially defines the spacing of warp threads 14 in the element being woven. A shuttle bed 18 comprising shuttle 19 and pickers 20 applies the weft strands 21 to the warp threads 14 as the latter are advanced by action of a take-up roller not shown. The warp threads 14 are selectively raised or lowered by the action of heddles 11; and thus are caused to appear on the top or bottom of the resulting fabric. Woven elements in an endless variety of patterns, colors, etc. thus are achieved.

Figure 2:
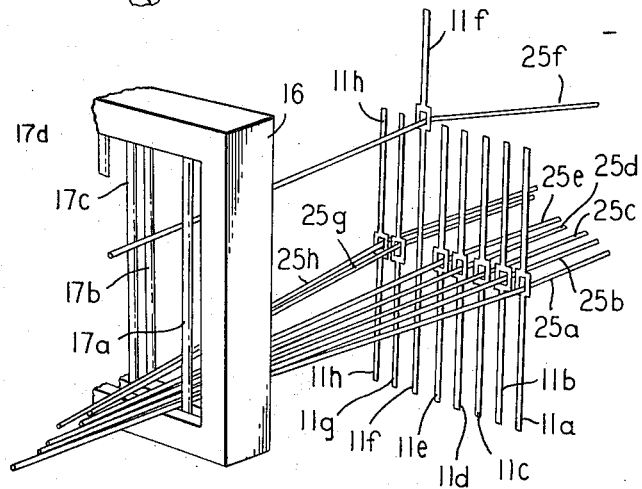
FIG. 2 is a schematic perspective detail of the machine method.

FIG. 2 shows a partial enlargement of the loom of FIG. 1, set up to weave multiple ply fabric. The optical fibers are the warp strands and are to be arranged in columns. The fibers of a given column are to be interchanged in column position according to plan, and thereafter locked.

Figure 3A:
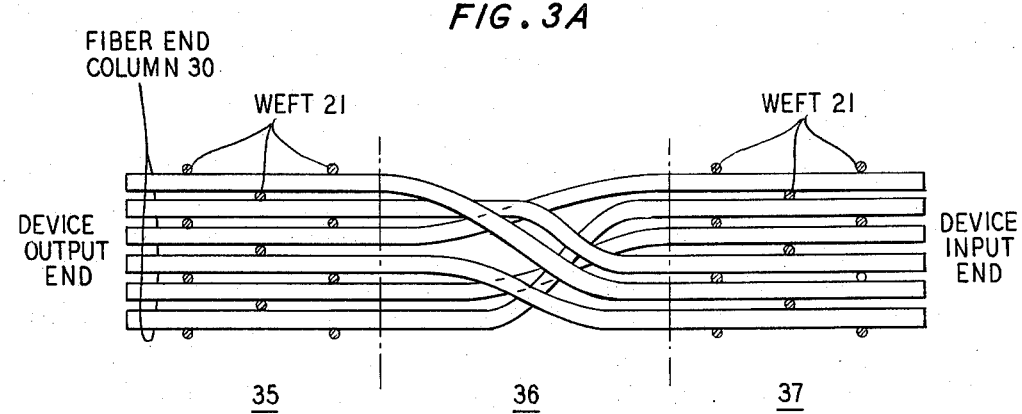
FIG. 3a is a schematic side view of a column of optical fibers showing transition between the input and output ends of individual fibers to different column positions.

Thus, a group of optical fibers, made up of fibers 25a–25h inclusive, comprises for example the fiber end column 30 in FIG. 3a. Each of the fibers 25a–25h are controlled by a respective heddle denoted in FIG. 2 by the numerals 11a–11h. The fibers 25a–25h according to the invention all are disposed between the adjacent reeds 17a, 17b. In like fashion, another group of optical fibers (not shown) are threaded through another group of heddles similar to heddles 11a–11h, and thereafter led between reeds 17c, 17d. This group is rearranged within itself as a separate fiber column.

As seen in FIG. 3a, a given fiber column is woven first in the relative positions depicted as output portion 35. Then, the optical fibers within each given fiber column are transposed according to a predetermined plan, in a transition section 36 in which no weft strands are employed. Once the transposition is complete, the fibers of a given column are woven in the new relative positions depicted as input portion 37.

In binding together the fiber output portion 35, placement of the weft strands 21 is made across and through the portion 35 with the loom of FIG. 2 by conventional manipulation of the warp plies in synchronization with the weft strand movement behind the shuttle. In like manner, the input portion 37 is bound together;

The fiber transformations achievable for example on the loom of FIG. 2, according to the invention, involve selected position changes of optical fibers only within an individual column such as 30. A discussion of three exemplary end transformations at this point will serve to illustrate the device types constructable according to the invention; and will also aid in an understanding of the final process steps thereafter to be described.

Figure 4B:
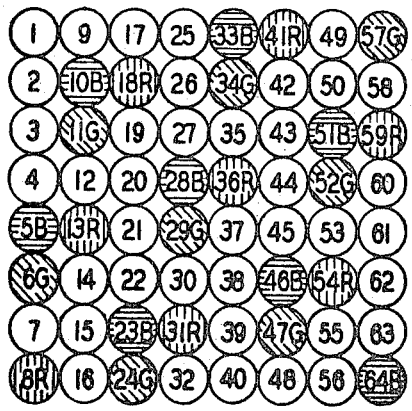
FIG. 4a–4b, 5a–5b and 6a–6b are input-output arrays of three exemplary end patterns for use in building image interleavers.
Figure 4A:
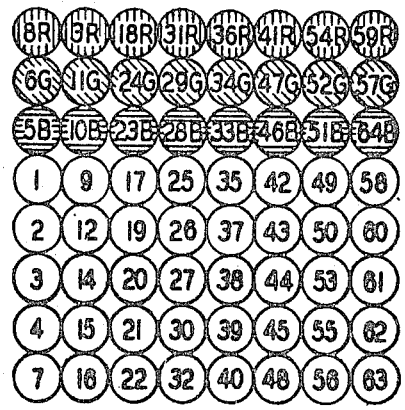

FIGS. 4a and 4b depict the input and output ends respectively of a fiber optic color interleaver assembly. The circles represent individual optical fibers which pursuant to the invention are arranged in rows and columns as depicted. The numerals within each circle denote a specific optical fiber and are not to be confused with uncircled numeral call-outs appearing elsewhere in the specification. The fiber end output array of FIG. 4b consists of columns, The fibers numbered from 1–8 respectively, comprise the far left column; the fibers numbered 9–16 respectively comprise the adjacent column; and so on. The letters R, G, and B following certain of the encircled numbers denote that the associated fibers are intended to receive and transmit signals of the wavelength of red, greem, and blue respectively. The unlettered fibers are arranged to transmit composite wavelengths netting the color white. As seen in FIG. 4a, a given column includes one red, one green, and one blue-transmitting optical fiber; and five other fibers which transmit white light. The different shadings associated with the red, green, and blue-transmitting optical fibers and the absence of shading in the other fibers, further aid in viewing the fiber transformations.

The corresponding columns of FIGS. 4a and 4b contain the same optical fibers. Thus, the two far right columns each contain the fibers numbered 57 through 64. Pursuant to the invention, it is permissible for example for the fiber designated 8R in FIG. 4a to assume any of the eight positions in the corresponding column in FIG. 4b. Fiber 8R, in fact, runs from the topmost to the bottommost positions in going from the input to the output array. Each of the other fibers 1, 2, 3, 4, 5b, 6g, and 7 also proceed to their new assigned positions in the output array.

Figure 3B:
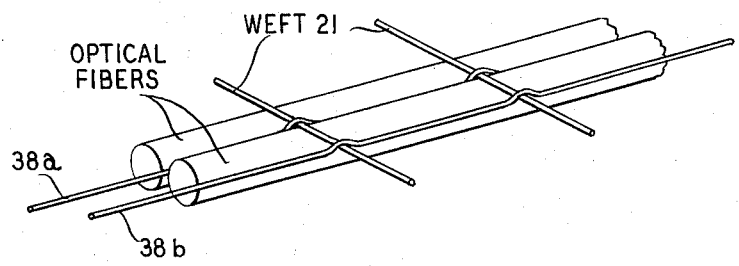
FIG. 3b is a schematic perspective view of fibers as warp strands and including binder strands.

Numerous types of weft strand weaves can be employed to bind together the separate fiber groups at the input end portion 38. The weave shown in FIG. 3b is made with binder strands such as 38a and 38b, each binder strand being associated with a respective one of the optical fibers. In such case each binder strand also is handled by its own heddle much in the manner shown in FIG. 2. The binder material should possess strength and flexibility, and be compatible with the fiber cladding to avoid damaging it. Binder materials such as cotton thread, polyamide fiber, polyester fiber, and polyolefin fiber are suitable. A preference for polyamide or polyester fiber as a binder exists because of their flexibility, high strength per denier and the fact that they do not chafe the optical fibers.

As already suggested, a prime virtue of the optical fiber device assembly procedure herein described is its programability. The capability is available of producing one or many modules of the same design, and then producing one or many modules of a different design, all quickly and sequentially. The modified Jacquard loom of FIG. 2 (as well as dobby looms, for example) automatically carry out format change instructions. The process moreover yields the same format changes from run to run, inexpensively, rapidly, and to tolerances acceptable for practical image interleavers.

Optical fiber material suitable for assembly pursuant to the described process should possess high transmission efficiency for the visible spectrum, as well as strength and flexibility. Light guides in the form of fibers 0.010 inch in diameter and fabricated from Crofon are obtainable from E. I. Du Pont de Nemoirs Inc., have been found quite suitable. Other optical fibers suitable for processing as above include clad glass, obtainable as small as one micron in diameter and thus attractive for some devices because of the higher resolution obtainable with the small diameter fibers.

It has been mentioned that the types of devices herein described are realized by constructing assemblies of the type sbown in FIG. 3a, for example. Several assemblies at once, however, can be constructed on the same loom since the looms can be adapted to handle large numbers of fibers simultaneously. In terms of numbers of plies and columns, the upper limit to module size is governed only by the physical size of the loom.

Assembly of modules produced pursuant to the invention is facilitated, for example, by adhesive bonding of the modules in a fixture (not shown). Preferred bonding agents include epoxy resins. Adhesive bonding agents can, if desired, also be employed to fasten the fibers of the transition section 36.

Figure 5B:
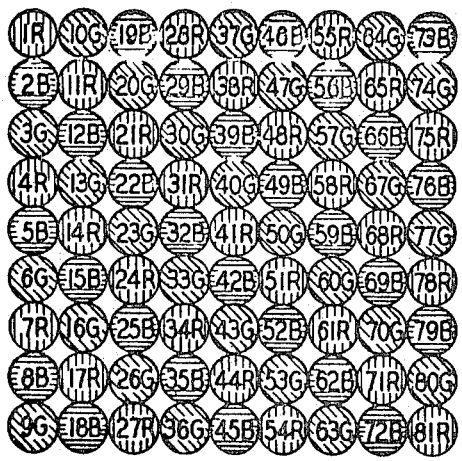
Figure 5A:
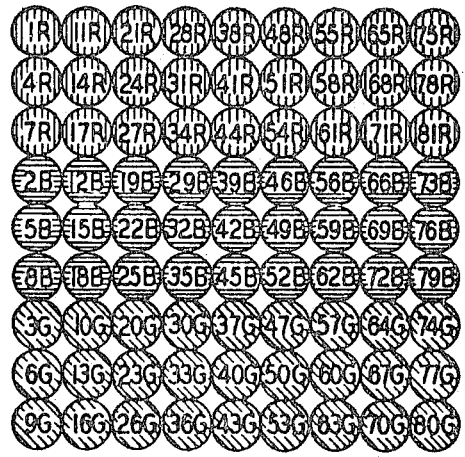
Figure 6B:
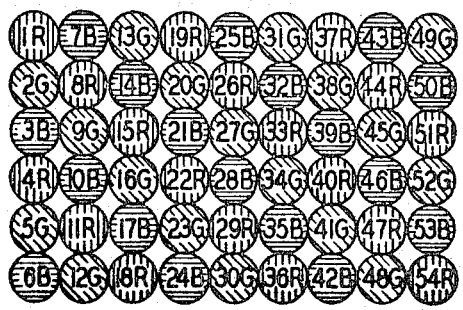
Figure 6A:
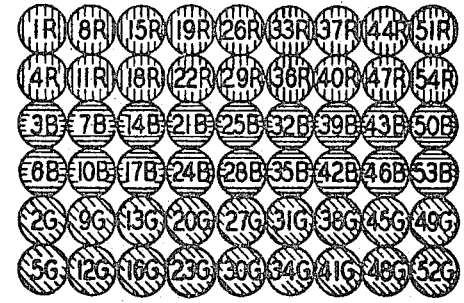

The fiber transformations of FIGS. 5a-5b and of FIGS. 6a-6b represent two varieties of image interleaver producible pursuant to the invention. They both are distinguished by the absence of white-transmitting fibers. Their advantages are that a good color image can be formed at the output end (5a or 5b) while at the input end the image is sent in color dissected. That is, the image is separated into selected discrete primary color components. This arrangement furthermore is readily woven in accordance with the present teachings.

Optical scramblers and descramblers are readily made in accordance with the inventive teachings, as can be illustrated again by resort to the transformations of FIGS. 4a-4b. The method by which fiber transformations are made within columns of the 8 × 8 array of fibers, has already been described. Let it be assumed that the pattern of FIG. 4a represents an unscrambled, or actual, optical signal—either digital or analog. The transformation from the FIG. 4a pattern to the FIG. 4b pattern then represents one, and only one, possible scrambling of the optical signal. The transformation has the virtue of having been programed. Accordingly, by running the loom program in reverse or reversing the assembly steps, a second assembly is produced having the capability of receiving the scrambled signal at its input (i.e., FIG. 4b) end, and of causing the signal to be descrambled when it reaches the assembly's output end.

Numerous assemblies can, of course, be ganged to produce a larger optical scrambler, each module having its own fiber transformation program. The transformation programs preferably are based on computer-generated random number patterns. Advantageously, by the methods of the present invention, any number of identical optical scramblers, and their mating descramblers, can be made automatically. Heretofore, the art offered only a single scrambler and its single mating descrambler.

The spirit of the invention is embraced in the scope of the claims to follow.

What is claimed is:

1. Method of positioning the optical fibers of a multiply fiber optics device consisting at its input and output end faces of a plurality of adjacent columns of fiber ends with a transition section thereinbetween in which the position sequence of fibers in each given column is controllably changed, comprising the steps of:

using a multiply weaving loom which includes a plurality of reed pairs and a plurality of heddles associated with each reed pair, threading optical fibers as warp strands through said heddles and reed pairs;

continuously advancing said optical fibers;

with said heddles held to create an input end ply position sequence amongst the optical fibers within each said reed pair, weaving weft strands across said optical fibers to hold them in said input end sequence;

interrupting said weft strand weaving and thereafter adjusting said heddles to transpose said optical fibers to a different and predetermined output end ply position sequence for said optical fibers within their respective reed pair; and thereafter, resuming weaving weft strands across said optical fibers to hold them in said output end sequence;

whereby the column positions of fiber ends created along any two cross sections of said input end are identical, and likewise, the column positions of fiber ends created along any two cross sections of said output end are identical, but as between the input end and the output end of any given fiber column the fiber end positions are controllably changed.

2. Method pursuant to claim 1, wherein said transposing step is accomplished specifically without the weaving of any weft strand in said transition section.

* * * * *